US011194014B1

(12) United States Patent
Jackson et al.

(10) Patent No.: US 11,194,014 B1
(45) Date of Patent: Dec. 7, 2021

(54) SYSTEM, METHOD AND APPARATUS FOR RECOVERING POLARIZATION RADAR DATA

(71) Applicant: Government of the United States, as represented by the Secretary of the Air Force, Wright-Patterson AFB, OH (US)

(72) Inventors: Julie Ann Jackson, Xenia, OH (US); Forest A. Lee-Elkin, Xenia, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 287 days.

(21) Appl. No.: 16/267,444

(22) Filed: Feb. 5, 2019

Related U.S. Application Data

(60) Provisional application No. 62/633,928, filed on Feb. 22, 2018.

(51) Int. Cl.
*G01S 7/02* (2006.01)
*G01S 7/40* (2006.01)

(52) U.S. Cl.
CPC .............. *G01S 7/023* (2013.01); *G01S 7/024* (2013.01); *G01S 7/4008* (2013.01); *G01S 7/4021* (2013.01)

(58) Field of Classification Search
CPC .... G01S 13/90; G01S 13/0209; G01S 13/951; G01S 7/023; G01S 7/024; G01S 7/025; G01S 7/23; G01S 7/24; G01S 7/25; G01S 7/4008; G01S 7/4021; Y02A 90/18; Y02A 90/10

USPC ....................................... 342/188, 26 R, 25 F
See application file for complete search history.

(56) References Cited

U.S. PATENT DOCUMENTS

| | | | |
|---|---|---|---|
| 4,959,653 A | 9/1990 | Ganz |
| 5,247,303 A | 9/1993 | Cornelius |
| 5,313,210 A | 5/1994 | Gail |
| 5,469,166 A | 11/1995 | Regev |
| 5,552,787 A | 9/1996 | Schuler |
| 5,867,118 A | 2/1999 | McCoy |
| 5,923,285 A | 7/1999 | Andrusiak |
| 6,556,002 B1 | 4/2003 | Greenbaum |
| 6,597,634 B2 | 7/2003 | O'Brien |
| 6,608,587 B1 | 8/2003 | Sparrow |
| 6,803,875 B1 | 10/2004 | Alford |
| 6,911,937 B1 | 6/2005 | Sparrow |
| 7,269,538 B1 | 9/2007 | O'Brien |

(Continued)

OTHER PUBLICATIONS

Tianyao Huang, Cognitive Random Stepped Frequency Radar with Sparse Recovery, IEEE Aug. 2, 2013 (Year: 2013).*

(Continued)

*Primary Examiner* — Erin F Heard
*Assistant Examiner* — Michael W Justice
(74) *Attorney, Agent, or Firm* — AFMCLO/JAZ; David E. Franklin

(57) ABSTRACT

A method and apparatus that measure M coupled channels of radar polarization data ($\tilde{y}$), that is a subset, which is less than the full set of received coupled channels. Sparse recovery operations are performed on the measured M coupled channels of radar polarization data ($\tilde{y}$) and a representation of a set of more than M channels of radar polarization data is generated from the sparse recovery performed on the subset of coupled channels.

25 Claims, 5 Drawing Sheets

(56) References Cited

U.S. PATENT DOCUMENTS

| | | | |
|---|---|---|---|
| 7,355,546 | B2 | 4/2008 | Randall |
| 7,643,377 | B1 | 1/2010 | Uzes |
| 8,125,370 | B1 | 2/2012 | Rogers |
| 8,665,144 | B2 | 3/2014 | Venkatachalam |
| 8,854,250 | B2 | 10/2014 | Keranen |
| 9,484,992 | B2 | 11/2016 | Kang |
| 9,641,357 | B1* | 5/2017 | Pajovic ............... H04L 25/0204 |
| 9,791,563 | B1 | 10/2017 | Thompson |
| 10,042,046 | B2 | 8/2018 | Liu |
| 2010/0001901 | A1 | 1/2010 | Baraniuk |
| 2011/0006944 | A1 | 1/2011 | Goldman |
| 2011/0241934 | A1 | 10/2011 | Sarkis |
| 2011/0279324 | A1 | 11/2011 | Bolotski |
| 2011/0285582 | A1 | 11/2011 | Zhang |
| 2012/0250748 | A1 | 10/2012 | Nguyen |
| 2012/0268309 | A1 | 10/2012 | Samuel |
| 2012/0313810 | A1 | 12/2012 | Nogueira-Nine |
| 2013/0236115 | A1 | 9/2013 | Nguyen |
| 2014/0015713 | A1 | 1/2014 | Liu |
| 2014/0077989 | A1 | 3/2014 | Healy |
| 2014/0111372 | A1 | 4/2014 | Wu |
| 2014/0218226 | A1 | 8/2014 | Raz |
| 2014/0247181 | A1 | 9/2014 | Nogueira-Nine |
| 2014/0266619 | A1 | 9/2014 | Ali |
| 2015/0192671 | A1 | 7/2015 | Zhang |
| 2016/0341814 | A1* | 11/2016 | Nguyen ................ G01S 7/023 |
| 2017/0097684 | A1 | 4/2017 | Lien |
| 2017/0315221 | A1* | 11/2017 | Cohen .................. G01S 13/347 |
| 2017/0336500 | A1 | 11/2017 | Luo |
| 2018/0052229 | A1 | 2/2018 | Ranney |
| 2018/0128892 | A1* | 5/2018 | Granato ................. G01S 3/74 |
| 2018/0143295 | A1 | 5/2018 | Crane |

OTHER PUBLICATIONS

A. Freeman, Y. Shen, and C. L. Werner, "Polarimetric sar calibration experiment using active radar calibrators," IEEE Transactions on Geoscience and Remote Sensing, vol. 28, No. 2, pp. 224-240, Mar. 1990.

J. J. van Zyl, "Calibration of polarimetric radar images using only image parameters and trihedral corner reflector responses," IEEE Transactions on Geoscience and Remote Sensing, vol. 28, No. 3, pp. 337-348, May 1990.

M. Cetin and W. C. Karl, "Feature-enhanced synthetic aperture radar image formation based on nonquadratic regularization," IEEE Trans. on Image Processing, vol. 1, No. 4, pp. 623-631, Apr. 2001.

T. Kragh and A. Kharbouch, "Monotonic iterative algorithms for SAR image restoration," in IEEE International Conf. on Image Processing, 2006, pp. 645-648.

M. Cetin, I. Stojanovic, N. O. Onhon, K. R. Varshney, S. Samadi, W. C. Karl, and A. S. Willsky, "Sparsity-driven synthetic aperture radar imaging," IEEE Signal Processing Magazine, pp. 27-40, Jul. 2014.

L. C. Potter, E. Ertin, J. T. Parker, and M. Cetin, "Sparsity and compressed sensing in radar imaging," Proceedings of the IEEE, vol. 98, No. 6, pp. 1006-1020, Jun. 2010.

C. D. Austin, E. Ertin, and R. L. Moses, "Sparse multipass 3D SAR imaging: applications to the GOTCHA data set," in Proceedings SPIE, vol. 7337, 2009, pp. 733 703-733 703-12.

M. Ferrara, J. A. Jackson, and C. Austin, "Enhancement of multipass 3D circular SAR images using sparse reconstruction techniques," in Proceedings SPIE, vol. 7337, 2009, pp. 733 702-733 702-10.

J. A. Jackson and R. L. Moses, "Synthetic aperture radar 3D feature extraction for arbitrary flight paths," IEEE Trans. on Aerospace and Electronic Systems, vol. 48, No. 3, pp. 2065-2084, Jul. 2012.

N. Ramakrishnan, E. Ertin, and R. L. Moses, "Enhancement of coupled multichannel images using sparsity constraints," IEEE Trans. on Image Processing, vol. 19, No. 8, pp. 2115-2136, Aug. 2010.

S. Samadi, M. Cetin, and M. A. Masnadi-Shirazi, "Sparse representation-based synthetic aperture radar imaging," IET Radar, Sonar Navigation, vol. 5, No. 2, pp. 182-193, Feb. 2011.

Samadi et al., "Multiple feature-enhanced SAR imaging using sparsity in combined dictionaries," IEEE Geo-science and Remote Sensing Letters, vol. 10, No. 4, pp. 821-825, Jul. 2013.

K. R. Varshney, M. Cetin, J. W. Fisher, III, and A. S. Willsky, "Sparse representation in structured dictionaries with application to synthetic aperture radar," IEEE Trans. on Signal Processing, vol. 56, No. 8, pp. 3548-3561, Aug. 2008.

G. B. Hammond and J. A. Jackson, "SAR canonical feature extraction using molecule dictionaries," in IEEE Radar Conf., Apr. 2013, pp. 1-6.

V. M. Patel, G. R. Easley, D. M. Healy Jr., and R. Chellappa, "Compressed synthetic aperture radar," IEEE Journal of Selected Topics in Signal Processing, vol. 4, No. 2, pp. 244-254, Apr. 2010.

J. Xu, Y. Pi, and Z. Cao, "Bayesian compressive sensing in synthetic aperture radar imaging," IET Radar Sonar and Navigation, vol. 6, No. 1, pp. 2-8, 2012.

R. Baraniuk and P. Steeghs, "Compressive radar imaging," in IEEE Radar Conf., 2007, pp. 128-133.

W. Qiu, H. Zhao, J. Zhou, and Q. Fu, "High-resolution fully polarimetric ISAR imaging based on compressive sensing," IEEE Trans. on Geoscience and Remote Sensing, vol. 52, No. 10, pp. 6119-6131, Oct. 2014.

K. Aberman and Y. C. Eldar, "Sub-nyquist SAR via Fourier domain range-doppler processing," IEEE Trans. on Geoscience and Remote Sensing, pp. 1-17, 2017.

D. L. Donoho, "Compressed sensing," IEEE Trans. on Information Theory, vol. 52, No. 4, Apr. 2006.

D. L. Donoho, M. Elad, and V. N. Temlyakov, "Stable recovery of sparse overcomplete representations in the presence of noise," IEEE Trans. on Information Theory, vol. 52, No. 1, Jan. 2006.

R. Baraniuk, "Compressive sensing [lecture notes]," IEEE Signal Processing Magazine, vol. 24, No. 4, pp. 118-121, Jul. 2007.

S. W. Chen, Y. Z. Li, X. S. Wang, S. P. Xiao, and M. Sato, "Modeling and interpretation of scattering mechanisms in polarimetric synthetic aperture radar: Advances and perspectives," IEEE Signal Processing Magazine, vol. 31, No. 4, pp. 79-89, Jul. 2014.

W. L. Cameron and L. K. Leung, "Feature motivated polarization scattering matrix decomposition," in IEEE International Radar Conf., 1990, pp. 549-557.

M. A. Saville, J. A. Jackson, and D. F. Fuller, "Rethinking vehicle classification with wide-angle polarimetric SAR," IEEE Trans. on Aerospace and Electronic Systems, vol. 29, No. 1, pp. 41-49, Jan. 2014.

C. Zhu, "Stable recovery of sparse signals via regularized minimization," IEEE Trans. on Information Theory, vol. 54, No. 7, pp. 3364-3367, Jul. 2008.

E. van den Berg and M. P. Friedlander, "Probing the pareto frontier for basis pursuit solutions," SIAM Journal on Scientific Computing, vol. 31, No. 2, pp. 890-912, 2008.

S. S. Chen, D. L. Donoho, and M. A. Saunders, "Atomic decomposition by basis pursuit," SIAM Review, vol. 43, No. 1, pp. 129-159, 2001.

J. A. Jackson and F. Lee-Elkin, "Channel crosstalk model for fully-polarimetric SAR compressive sensing," 2017 IEEE Radar Conference (RadarConf), Seattle, WA, 2017, pp. 1536-1541.

Ryan J. Tibshirani and Jonathan Taylor, "The solution path of the generalized lasso," The Annals of Statistics, vol. 39, No. 3 (2011), 1335-1371.

SPGL1: A solver for large-scale sparse reconstruction, https://www.cs.ubc.ca/~mpf/spgl1/, Version 1.9, Apr. 2015.

I1-MAGIC, https://statweb.stanford.edu/~candes/l1magic/, 2004.

NESTA A Fast and Accurate First-order Method for Sparse Recovery, https://statweb.stanford.edu/~candes/nesta/April2009.

ASP—A Matlab solver for sparse optimization, https://www.cs.ubc.ca/~mpf/asp/, Version 1.0, Dec. 17, 2012.

* cited by examiner

SYSTEM, METHOD AND APPARATUS FOR RECOVERING POLARIZATION RADAR DATA

CROSS-REFERENCE TO RELATED APPLICATION

This application claims the benefit of U.S. Provisional Application No. 62/633,928 filed on Feb. 22, 2018, the entire content of which is hereby incorporated by reference.

STATEMENT OF GOVERNMENT INTEREST

The invention described herein may be manufactured, used, and licensed by or for the Government of the United States for all governmental purposes without the payment of any royalty.

BACKGROUND

In existing radar systems there is no acceptable method to completely drop a channel o100f the polarimetric radar data and yet still recover the full set of polarimetric channel data. Typically, radar polarization crosstalk is controlled by additional design effort to attempt to reduce the channel mixing in hardware. Reducing crosstalk in this manner is difficult, and it is impossible to completely eliminate crosstalk.

SUMMARY OF INVENTION

An embodiment disclosed is directed to a method ("the method") comprising: measuring M coupled channels of radar polarization data ($\tilde{y}$); performing sparse recovery operations on the measured M coupled channels of radar polarization data ($\tilde{y}$); and estimating a representation of M' channels of radar polarization data when M' is greater than M.

An embodiment disclosed is directed to an apparatus ("the apparatus") comprising: one or more antennas performing a transmit function; one or more antennas performing a receive function; one or more radar signal devices, operatively coupled to the one or more transmit antennas, configured to effect signal emission from the transmit antennas; one or more devices, operatively coupled to the one or more receive antennas, configured to discard one or more receive channels to effect reduction of the number of signal channels to M; one or more radar processor devices, operatively coupled to the one or more receive antennas, configured to transform M coupled received signals into M coupled channels of radar polarization data ($\tilde{y}$); and one or more processing devices comprising sparse recovery module, configured to transform M coupled channels of radar polarization data ($\tilde{y}$) into an estimate of a representation of M' channels of radar polarization data where M'>M.

BRIEF DESCRIPTION OF THE DRAWINGS

The accompanying drawings provide visual representations, which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
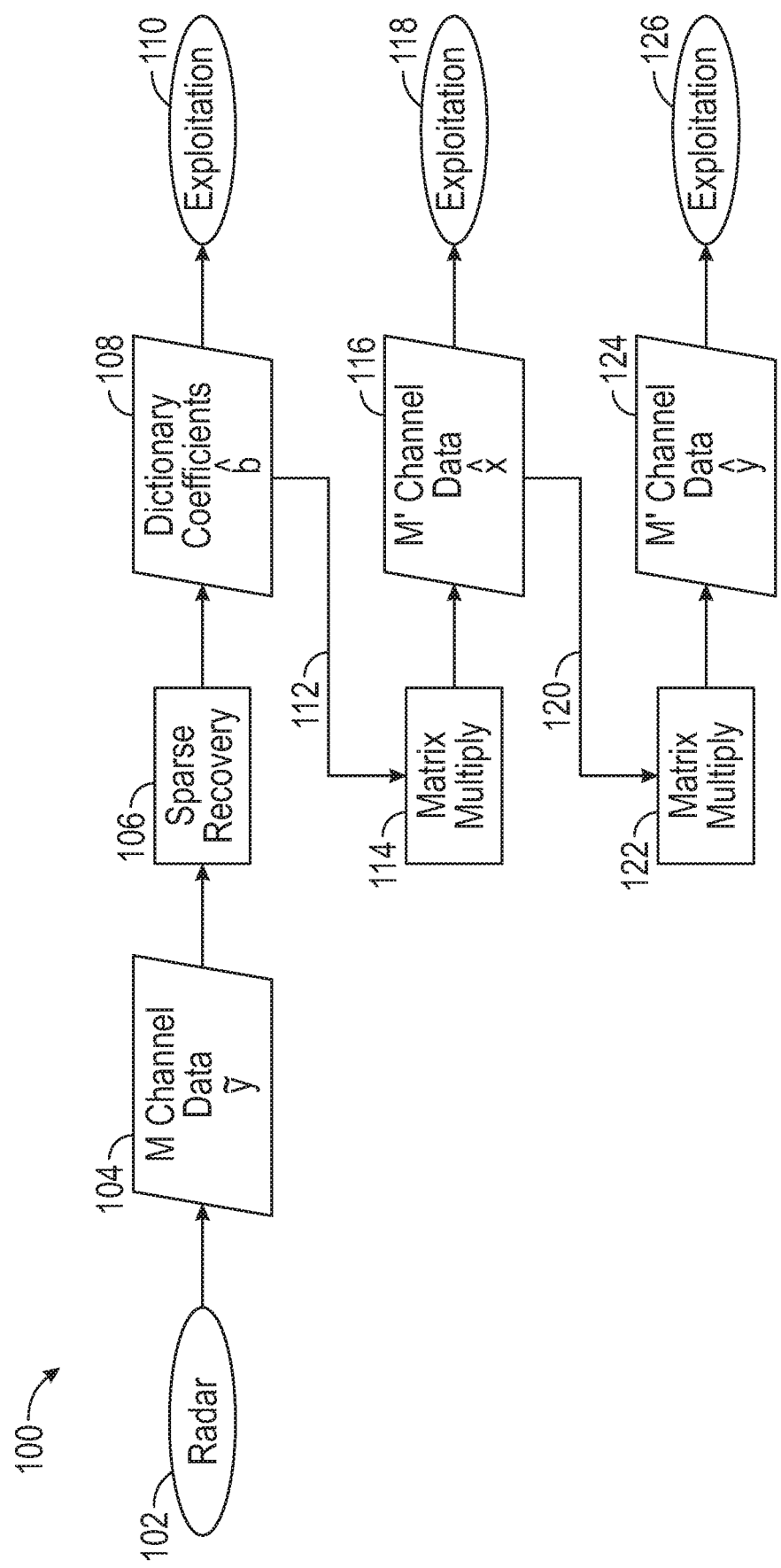
FIG. 1 illustrates a diagram to estimate a representation of M' channels of radar polarization data from M coupled channels of radar polarization data when M' is greater than M.

While this disclosure is susceptible of embodiment in many different forms, there is shown in the drawings and will herein be described in detail specific embodiments, with the understanding that the present disclosure is to be considered as an example of the principles described and not intended to limit the disclosure to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprise", "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Unless stated otherwise, terms such as "first" and "second" are used to arbitrarily distinguish between the elements such terms describe. Thus, these terms are not necessarily intended to indicate temporal or other prioritization of such elements.

Reference throughout this document to "one embodiment", "certain embodiments", "an embodiment" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

A "module" as used herein describes a component or part of a program or device that can contain hardware or software, or a combination of hardware and software. In a module that includes software, the software may contain one or more routines, or subroutines. One or more modules can make up a program and/or device. In the discussion that follows, the terms module and unit are used interchangeably.

In the discussion that follows, the terms mixing, coupling, and crosstalk are used interchangeably. These terms shall be afforded equivalent meaning, as each term is common to the field and the literature.

Embodiments described herein relate to the design and production of polarimetric radars and radio frequency devices. Potential areas of application include remote sensing, radar surveillance, radar cross-section measurements, material measurements, agricultural and environmental monitoring, weather radar, and natural disaster assessment.

A single channel radar provides information on a scene's reflectivity at the radar's radio frequency and polarization. Multiple polarization channels provide additional signature information related to scatterer structure, shape, and orientation. Although radar designers typically attempt to isolate each polarization antenna, crosstalk between channels cannot be completely eliminated, and measurements are cross-contaminated by inputs corresponding to other channels. This signal cross-contamination is known in the field and literature interchangeably as channel mixing, coupling, or crosstalk.

Issue-one is the constraints on radar systems between size weight and power. These constrains can be particularly difficult for airborne radars. Reduction in the amount of data that the radar needs to collect may translate to size weight and power savings.

Issue-two is that, in some cases, the output data rate of the radar may exceed the capacity of the radar's band limited communication link to transmit the data to where it is needed; thus, resulting in data delays and also making issue-one worse due to the necessity of additional data storage hardware on the radar system.

Issue-three is that minimizing crosstalk is one of the engineering tasks in designing a polarimetric radar. If crosstalk minimization were not required then radar engineering design costs could be reduced.

Embodiments described herein are directed to the above.

Regularization techniques have been used on synthetic aperture radar (SAR) to remove noise, clutter, and point spread effects, and to enhance target visualization. Regularization has typically been applied to traditionally-collected SAR data: a single polarization channel of phase history with regularly-spaced samples in fast time and slow time. The effects of spectral masking may be removed via sparse regularization, but the masking is typically considered as a practical limitation of wideband transmissions, not as a sampling reduction scheme.

Compressive Sensing (CS) strategies for radar applications have attempted to recover radar reflectivity with an under-determined measurement set that is due to a reduced number of samples in slow and/or fast time. Methods have included randomized pulse repetition intervals and slow and/or fast time under-sampling.

CS efforts for polarimetric radar have considered fast and slow time sampling strategies but have not considered a reduced number of polarization channels. In some systems, each polarization channel follows the same slow and fast time sampling pattern and the $l_0$ norm on the signal vector is replaced by the $l_0$ norm of the sum of channel magnitudes.

Some CS efforts have assumed that each channel has the same sparsity support, and a mixed-norm multiple measurements vector problem is solved. However, in reality polarization channels may not have the same sparsity support (e.g. dihedral or trihedral scattering with non-zero co-pol response and zero cross-pol response).

It is desirable to obtain high fidelity information with a reduced number of measurements, but dropping fast-time samples or slow-time pulses in traditional Fourier-based radar processing methods reduces resolution, limits scene size, and/or increases sidelobes. With traditional processing, measuring less than a full set of polarization channels greatly reduces scene feature information; however, embodiments disclosed herein can remove the ill-effects of a reduced set of measurements.

A number of random sampling schemes have been proposed for synthetic aperture radar (SAR) and inverse synthetic aperture radar (ISAR). However, reduction in the number of polarization channel measurements has not yet been explored. One may compressively sense in fast and slow time and impose structure across polarization channels, but such techniques do not compressively sense across channels, (i.e., reduce the number of received polarization channels.) Embodiments described herein are directed to a method to reduce the number of received polarization channels to M and to recover M' channels of radar polarization data where M'>M.

The disclosed embodiments take advantage of cross-channel coupling to allow reduction of the number of polarization channels that the radar receiver needs to process. The M measured channels include crosstalk from unmeasured channel(s), and thus, the signal from the unmeasured channel(s) is not completely lost. Previous sparse recovery methods for polarimetric radar have not modeled channel coupling. The disclosed embodiments include channel coupling and recognizes that the mixing of channel information is important to reducing the number of received polarization channels.

Embodiments described herein utilize an optimization framework of sparse recovery equations. Existing methods of optimization framework of sparse recovery equations fail to consider reducing the number of received radar polarization channels.

Embodiments described herein utilize polarization channel coupling to recover polarization channel data when only a subset of polarization channels are measured. No existing methods utilize channel coupling. Channel coupling is typically undesirable.

Embodiments described herein impart transmit and/or receive channel coupling to improve the sparse recovery result.

Embodiments described herein provide an apparatus that is comprised of channel coupling modules and a channel reduction module, introduced into the radar.

Embodiments described herein provide an apparatus that is comprised of one or more processing devices comprising a sparse recovery module.

One embodiment disclosed is directed to reduced data collection, storage, communication, and/or processing requirements for multi-channel polarimetric radar.

Embodiments described herein provide a method to reconstruct M' channels of radar polarization data while only measuring, and optionally recording, a subset M<M' of the polarization channels. Crosstalk removal is accomplished on the M' channels during reconstruction of the M' channels of radar polarization data. Since fewer polarization channels need to be measured, there are probable savings in radar cost, size, weight, and power.

Since fewer polarization channels need to be sent via communication links, there is a reduction of demand on congested communications channels. In essence, the disclosure exploits polarimetric radar channel crosstalk as a desirable feature rather than a design obstacle.

A described method has the potential to maintain sufficient data integrity while reducing hardware costs. The disclosed channel reduction is complementary to fast time and slow time sampling schemes. Polarization channel reduction may be realized since reduction of the number of measured channels may be more beneficial to cost savings than reduced sampling methods in slow time or fast time.

In the detailed description that follows, a signal model is disclosed, general sparse recovery problem space is discussed, recovery methods are disclosed, and an apparatus is disclosed.

As described herein, the multi-channel polarimetric signal model and incorporated channel crosstalk will be explored in detail. In the discussion that follows, bold lowercase indicates a vector, and bold uppercase indicates a matrix.

Consider measuring M of M' available polarization channels. Let $x_{m'}$ be an N'×1 vector of unknown reflectivity values in m'=1, ..., M' available channels. Let $y_m$ be the corresponding N×1 vector of observed values for each of m=1, ..., M measured channels. The discrete linear system radar model for the $m^{th}$ channel can be written as $$y_m = A_m x_m + w_m$$

for operator $A_m$ and noise vector $w_m$. The matrix $A_m$ maps scene reflectivity to measurements, e.g., a range profile, image, or phase history. The operations modeled by the matrix $A_m$ are typically performed by the radar receiver and signal processor module 420 in FIG. 4. Stacking the single channel vectors, one obtains the multi-channel reflectivity vector $x=[x_1^T, \ldots, x_{M'}^T]^T$, the multi-channel observation vector
$y=[y_1^T, \ldots, y_{M'}^T]^T$, and multi-channel additive noise vector $w=[w_1^T, \ldots, w_{M'}^T]^T$. Then, expanding the mapping operator, the multi-channel model for M=M' (all possible channels measured) is $$\begin{bmatrix} y_1 \\ y_2 \\ \vdots \\ y_{M'} \end{bmatrix} = \begin{bmatrix} A_1 & 0 & 0 & \ldots \\ 0 & A_2 & 0 & \\ 0 & 0 & \ddots & 0 \\ 0 & 0 & 0 & A_{M'} \end{bmatrix} \begin{bmatrix} x_1 \\ x_2 \\ \vdots \\ x_{M'} \end{bmatrix} + \begin{bmatrix} w_1 \\ w_2 \\ \vdots \\ w_{M'} \end{bmatrix}$$

which may be defined as $$y = \tilde{A}_{M'} x + w.$$

In practice, channel coupling, or crosstalk, causes mixing of the reflectivity channels $x_{m'}$ in the observations $y_{m'}$. The ideal block-diagonal structure of $\tilde{A}_{M'}$ does not capture such mixing. To model crosstalk, it is possible to introduce the M'×M' crosstalk matrix C that contains coefficients specifying what mixture of the M' pure channels is observed in each of the 1, ..., M' contaminated channels. Then, the discrete linear system radar model with crosstalk can be written as $$y = \tilde{A}_{M'}(C \otimes I_{N'})x + w,$$

where $I_{N'}$ is an N'×N' identity matrix. The Kronecker product is denoted by ⊗. In general, C is complex-valued to account for both magnitude and phase interactions. Channel coupling is generally considered an undesirable degradation of signals. However, embodiments described herein exploit the mixing of channels to reduce the number of received polarization channels required. It is possible to recover M' channels of radar polarization data while measuring only M<M' coupled channels of radar polarization data.

One or more of the embodiments described herein include a transmit channel coupling module and/or a receive channel coupling module that may be used to adjust the value of C. The quality of the sparse representation of M' channels of radar polarization data will depend on the value of C.

Let J be an M×M' indicator matrix that denotes the channels being kept by the channel reduction module. Matrix J is formed by dropping the removed channel rows from an M'×M' identity matrix. Matrix J could also be formed by additively combining channels, such as by averaging, in order to reduce the total number of channels. Then, the radar model measuring M≤M' coupled channels of radar polarization data is $$\tilde{y} = \tilde{A}_M(JC \otimes I_{N'})x + \tilde{w},$$

where $\tilde{y}$ and $\tilde{w}$ correspond to vectorized stacks of only the M channels kept by the channel reduction module and $\tilde{A}_M$ is a block diagonal matrix of the operators $A_m$ corresponding to only the M channels kept by the channel reduction module. The goal of polarization recovery algorithms will be to estimate the M' polarization channels of reflectivity x from the M<M' coupled channels of radar polarization data $\tilde{y}$.

One or more of the embodiments described herein include a channel reduction module that can perform the function modeled by J. The quality of the sparse representation of M' channels of radar polarization data will depend on the value of J.

The reflectivity x can be decomposed in a polarization dictionary that aids in target recognition and scene interpretation. Then, the goal will be to estimate a sparse set of coefficients in the polarization dictionary. The reflectivity x can be written as $$x = Db \qquad (1)$$

where D is an M'N'×Q dictionary of Q scattering signatures. The dictionary D captures both polarization and spatial responses, and b is a coefficient vector that extracts scene structure information contained in the dictionary columns.

Then, the discrete linear system radar model with M measured and M' available channels can be written as:

$$\tilde{y} = \tilde{A}_M(JC \otimes I_{N'})Db + \tilde{w}, \qquad (2)$$

where the matrix operations can be aggregated into a single matrix $$A = \tilde{A}_M(JC \otimes I_{N'})D. \qquad (3)$$

To summarize, the M coupled channels of radar polarization data ($\tilde{y}$) are modeled by $$\tilde{y} = Ab + \tilde{w} \qquad (4)$$

where the matrix A is given by equation (3), b are the complex-valued data coefficients in the dictionary of equation (1), and $\tilde{w}$ is additive noise. If given b, then the crosstalk-corrected radar polarization data is readily computable using equation (1). (If the dictionary is an identity matrix, D=I, then coefficients b are simply reflectivity values x.) Two key functions of the measurement matrix A are to model the crosstalk and to omit measurement of one or more polarization channels.

Embodiments described herein provide an advancement in polarimetric radar, specifically, recovery of M' channels of radar polarization data while only measuring a coupled subset of the polarimetric channels.

Embodiments described herein utilize the advantage of the unavoidable existence of cross-talk between polarization channels and also the fact that data is usually sparse in an appropriately chosen dictionary D. Typically, crosstalk is minimized during the radar design and residual crosstalk correction is achieved by applying the inverse of the crosstalk matrix C to the full channel data. The disclosed method eliminates the need to minimize crosstalk during the radar design and performs crosstalk residual correction simultaneously with recovery of missing polarization channels.

Embodiments described herein utilize one or more channel coupling modules to impart crosstalk into the polarization channels.

From the signal model shown in equation (4) one may solve for the dictionary coefficients b, as this is equivalent to recovering the M' channels of radar polarization data (since the defined matrix multiply (1) computes x from b). The matrix A is of dimension MN×Q, where typically MN<Q, and the method also addresses the atypical case MN≥Q. A general approach to this type of problem is to use an estimate of the form:

$$\hat{b} = \underset{b}{\operatorname{argmin}} \|b\|_u \quad \text{s.t.} \quad \|\tilde{y} - Ab\|_v \leq \varepsilon \qquad (5)$$

where $\varepsilon$ is a positive constant that would logically be chosen in accordance with the characteristics of the noise $\tilde{w}$. The problem can also be posed in a Lagrangian form $$\hat{b} = \underset{b}{\operatorname{argmin}} \|\tilde{y} - Ab\|_v + \lambda\|b\|_u \qquad (6)$$

which matches the sparse regularization form. A third equivalent form, $$\hat{b} = \underset{b}{\operatorname{argmin}} \|\tilde{y} - Ab\|_v \quad \text{s.t.} \quad \|b\|_u \leq \tau \qquad (7)$$

is often called the Lasso problem. Given one of $\varepsilon$, $\lambda$, and $\tau$ there exists values for the other two that makes the problems of equations (5), (6), and (7) equivalent. The mappings between equivalency inducing values of $\varepsilon$, $\lambda$, and $\tau$ may be difficult to obtain. The mathematical equations (5), (6), (7) is a sparse recovery situation. Sparsity (according to the u norm) is balanced with residual error (as measured by the v norm). The balance between sparsity and residual error is controlled by the parameter $\varepsilon$, $\lambda$, $\tau$ respectively for equations (5), (6), (7).

For parameter values u≥1, v≥1, the objective functions and constraints in equations (5), (6), (7) are convex. The convexity of the objective function and constraint means that optimization software may yield the solution. For the case (u=2, $\varepsilon$=0), the solution is obtained by the Moore-Penrose inverse (i.e., matrix pseudo-inverse).

Compressive sensing (CS) recovery algorithms known as basis pursuit "de-noising" address the case (u=1, v=2). Under specific conditions, CS methods are able to solve the non-convex case (u=0, v>0, $\varepsilon$=0). The case (u=1, v=2) is particularly well explored. Standard general purpose software based on interior point methods or simplex methods for linear programs can be used to solve the (u=1, v=2) case; however, specialized codes can be faster.

As noted previously, software code may be used to solve the sparse recovery problems (equations (5)(6)(7)). One embodiment of the disclosure is in the application of sparse signal recovery techniques to polarimetric radar in a way that enables the reduction of measurement channels, thereby introducing hardware and data cost savings.

By modeling and taking advantage of channel coupling (rather than trying to design it out of the system), polarimetric channel recovery fits into the sparse recovery mathematical framework.

Using the signal model, as shown in equation (2), the sparse recovery problem for recovering polarimetric radar data from a reduced number of channel measurements is $$\hat{b} = \underset{b}{\operatorname{argmin}} \|b\|_u \quad \text{s.t.} \quad \|\tilde{y} - \tilde{A}_M(JC \otimes J_{N'})Db\|_v \leq \varepsilon. \qquad (8)$$

Similarly, the equivalent Lagrangian and LASSO problems are $$\hat{b} = \underset{b}{\operatorname{argmin}} \|\tilde{y} - \tilde{A}_M(JC \otimes J_{N'})Db\|_v + \lambda\|b\|_u \qquad (9)$$

$$\hat{b} = \underset{b}{\operatorname{argmin}} \|\tilde{y} - \tilde{A}_M(JC \otimes I_{N'})Db\|_v \quad \text{s.t.} \quad \|b\|_u \leq \tau. \qquad (10)$$

In equations (8), (9), (10), the measurements $\tilde{y}$ could be raw signal data, range profiles, phase history, formed images, or other data products containing M out of M' radar channels or other acceptable form. The signal model matrices are, briefly, J reduces the number of received channels to M from M'
C is the channel coupling matrix
$I_{N'}$ is an N'×N' identity matrix
$\tilde{A}_M$ is the ideal M channel measurement operator
D is the scattering signature dictionary
b are the scattering signature dictionary coefficients
and the model is described previously.

Note that C, $\tilde{A}_M$, D, and b are complex-valued. The Kronecker product is denoted by $\otimes$. The channel selection matrix J is determined by which M out of M' polarization channels the radar measures. The channel coupling matrix C is determined by the inherent and/or intentional crosstalk that the radar exhibits. Radars are typically calibrated and in doing so, C is estimated and provided to the method. The measurement operator $\tilde{A}_M$ is dependent on the form of the measured data product $\tilde{y}$. For example: if $\tilde{y}$ contains vectorized two dimensional images, then $\tilde{A}_M$ performs range and cross-range compression; if $\tilde{y}$ is range profiles, then $\tilde{A}_M$ performs range compression but not cross-range compression; etc. The measurement operator $\tilde{A}_M$ does not necessarily need to be explicitly formed in order to solve equations (8)(9)(10). In general, the method will work with whatever form for $\tilde{A}_M$ is defined by the radar and application to which the method is applied.

The signature dictionary D may be tuned to the particular application. Polarimetric scattering features are associated with structures, such as wires, dihedrals, trihedrals, etc. Spatial scattering features are also associated with structures such as point, extended, isotropic, or anisotropic scatterers. One way to form the signature dictionary D is as a Kronecker product of a polarization dictionary P and a spatial dictionary S, such that $D = P \otimes S$. Different applications expect different typical polarization and spatial responses depending on the region of the world and expected environment.

As mentioned previously, sparse recovery methods can be used by generic optimization algorithms as well as by specializations to the specific cost function forms as shown by equations (5), (6), (7), herein. The radar embodiment illustrated in equations (8), (9), (10) is equivalent in form to equations (5), (6), (7), and therefore, optimization methods that apply to the generic situation also apply here.

As mentioned previously, for any ε there exists λ and τ such that equations (5), (6), (7) are equivalent. Thus, any of the three forms can be used, as described herein. The form of equations (5), (8) is preferred because it is straightforward to set E according to expected noise and clutter levels.

The choice of a particular solver is not critical and may be any suitable solver. By way of example, one may use the spgl1 solver package to solve equation (8). The spgl1 package is useful due to its availability, ease of use, and ability to handle both real and complex-valued problems. In general, b may be complex. The spgl1 package permits a user to specify the reduced channel signal model matrix A explicitly or through equivalent function operations. Furthermore, it allows for extension to alternative sparsity norms $u \neq 1$.

Embodiments described herein may be implemented on a suitable digital computing device that may be connected to multi-channel radar data streams, either directly or over a network. Areas of potential use include remote sensing, radar surveillance, radar cross section measurements, material measurements, and agricultural and environmental monitoring.

Various embodiments may utilize the following inputs: data from multiple polarimetric radar channels, knowledge of which polarization each channel of data corresponds to, knowledge or estimate of the full-channel coupling matrix, knowledge of the radar position and frequency for each measurement, and signal dictionaries (polarization, spatial, etc.). The output may include a set of polarimetric radar channel data with crosstalk removed or significantly reduced.

Alternative Numerical Solver Methods and Software

The general sparse recovery problem for case (u=1, v=2, ε≥0) has a number of algorithms that may be used for solving the $l_u$ minimization problems in equations (5), (6), and (7); the methods are types of convex optimization solutions.

A non-exhaustive list of possible solution methods according to equations (5), (6), (7) is given below. The algorithms listed below may be used to recover the signal vector b, each with different performance tradeoffs between accuracy and speed.

Greedy methods include: Matching Pursuit, Orthogonal Matching Pursuit, CLEAN, Directional Pursuit, Gradient Pursuit, Conjugate Gradient Pursuit, Stagewise Orthogonal Matching Pursuit, Stagewise Weak Gradient Pursuit, Regularized Orthogonal Matching Pursuit, Order Recursive Matching Pursuit (aka Stepwise Projection, Orthogonal Least Squares, and others), Iteratively weighted Least Squares, and Spectral Projected Gradient (SPGL1).

Thresholding type algorithms include: Basic Thresholding, Iterative Hard Thresholding, Hard Thresholding Pursuit, Forward-backward splitting methods, accelerated proximal gradient method, Iterative shrinkage-thresholding algorithm (ISTA) or iterative soft thresholding, fast iterative shrinkage-threshold algorithm (FISTA), Compressive Sampling Matching Pursuit (CoSAMP), and Subspace Pursuit.

Other Methods include: Primal-Dual Algorithm, Douglas-Rachford splittings, Alternating Direction Method of Multipliers (ADMM), Approximate Message Passing (and its extensions)

A number of numerical solver packages for BPDN/Lagrangian/LASSO sparse signal recovery problems are available online.

Recovery of Coefficients or Reconstituted Signal instead of Reflectivity Signal

As shown in FIG. 1 there is described a method to recover M' channels of radar reflectivity from measurements from M≤M' coupled channels of radar polarization data ($\tilde{y}$). After sparse recovery, any of the estimated coefficient vector $\hat{b}$, the multi-channel reflectivity estimate $\hat{x}$, or the reconstituted signal data $\hat{y}$ may be used for data exploitation tasks.

The estimated coefficients $\hat{b}$ contain the information regarding the polarization response of scatterers in the scene and may be used directly in scene analysis and target recognition tasks, for example. The estimated coefficients $\hat{b}$ may be transformed to the multi-channel reflectivity estimate $\hat{x}$, which is useful. However, transformation to reflectivity $\hat{x}$ is not necessarily required.

Further transformation to $\hat{y} = \tilde{A}_M \hat{x}$ provides a reconstituted data vector, e.g. range profile, image, or phase history, in which the unmeasured channel(s) are recovered and crosstalk is removed.

Furthermore, any other transform of b to a second data representation is an alternative output of the method.

Alternative Signal Norms and/or Noise Norms

One embodiment of the sparse recovery case is (u=1, v=2, ε≥0) in equations (8), (9), and (10). However, other values of u and v may be used in equations (8), (9), and (10) to enforce different types of sparsity.

The u-norm optimally has 0≤u<2 to enforce sparsity. The spgl1 package enables the user to solve problems for signal norms $u \neq 1$. The v-norm measures the residual fit, which in the optimum case is the noise. Typically, v=2, which is the energy of the residual. Alternatively, the v=0 norm is non-zero when there is any residual error. The v=∞ norm measures the maximum residual error component. In general, v can be any value in the interval [0,∞].

Alternative Forms of the Sparse Recovery Objective Function

This disclosure describes a sparse recovery optimization technique to obtain solutions with low residual energy and sparsity on the coefficient vector b. Alternative suitable forms of the objective function may also be used for sparse recovery.

One alternative form is the generalized Lasso problem, which imposes sparsity on Tb (for some matrix T) instead of on b. The alternative forms of equations (5)-(7) for the generalized Lasso form are $$\hat{b} = \operatorname{argmin}_b \|Tb\|_u^u \text{ s.t. } \|\tilde{y} - Ab\|_v^v \leq \epsilon, \tag{11}$$

$$\hat{b} = \operatorname{argmin}_b \|\tilde{y} - Ab\|_v^v \text{ s.t. } \|Tb\|_u^u \leq \tau, \tag{12}$$

$$\hat{b} = \operatorname{argmin}_b \|\tilde{y} - Ab\|_v^v + \lambda \|Tb\|_u^u; \tag{13}$$

where $0 \leq u < 2$, u' is positive, v is non-negative, v' is positive, $\in$ is non-negative, $\tau$ is non-negative, $\lambda$ is non-negative, and T is a transform matrix.

Another example alternative to the objective function form is to employ more than one sparsity constraint. The radar image sparse regularization problem may be posed with two constraints, one on sparsity in b and a second on smoothness of a transform on b, which takes a form similar to the generalized Lasso constraint. The regularization solution is thus:

$$\min_b \|\tilde{y} - Ab\|_2^2 + \lambda_1^2 \|b\|_{u_1}^{u'_1} + \lambda_2^2 \|T|b|\|_{u_2}^{u'_2} \quad (14)$$

where $u_1$ and $u_2$ are non-negative, $u'_1$ and $u'_2$ are positive, $\lambda_1$ and $\lambda_2$ are non-negative, and T is a transform matrix. Equation (14) corresponds to the Lagrangian form with two penalty terms. Equation (14) may be extended to any number of penalty terms as $$\hat{b} = \arg\min_b \|\tilde{y} - Ab\|_v^{v'} + \Sigma_i \lambda_i \|T_i b\|_{u_i}^{u'_i}.$$

where v is non-negative, v' is positive, $u_i$ are non-negative, $u'_i$ are positive, $\lambda_i$ are non-negative, and $T_i$ are transform matrices.

Different $u_i$ norms could be used for each penalty term. Complexity of the recovery algorithm will increase with the number of terms and will depend on the norm chosen for each term.

In addition to the examples above, other alternative objective function forms that seek to optimize residual fit and sparsity in some domain may be used in the polarimetric radar multi-channel recovery problem.

Matrices Instead of Channel-Stacked Vectors

Another embodiment of the disclosure is directed to the objective function formulation for sparse recovery replacing the channel-stacked vectors with matrices with each column corresponding to a channel. That is, y is replaced by $Y = [y_1, \ldots, y_{M'}]$, x is replaced by $X = [x_1, \ldots, x_{M'}]$, and w is replaced by $W = [w_1, \ldots, w_{M'}]$. Then, $$Y = \tilde{\Theta} X + W, \quad (24)$$

where $\tilde{\Theta}$ is the required corresponding reformat of $\tilde{A}_{M'}$. Similarly, extending (13), $$Y = \tilde{\Theta} B + \tilde{W}, \quad (25)$$

where the columns of $\tilde{Y}$ and $\tilde{W}$ contain only the $M \leq M'$ coupled channels of radar polarization data and noise, respectively. The matrix $\Theta$ corresponds to the matrix A which contains the channel coupling, scattering signature dictionary, and indicator of which channels are retained at the channel step or by the module. Matrix B contains the dictionary coefficients.

The above matrix formulation is contained in the class of sparse recovery problems known as "multiple measurement vectors" (MMVs). Each column in the matrix is a measurement vector. Typically, MMV techniques assume the same support across measurement vectors, but polarimetric radar responses do not generally have the same support. Nevertheless, the MMV approach may be used for polarization problems.

Regardless of the support assumption, the matrix formulation can be used with algorithms such as FISTA to ease the computational burdens of recovery. The matrix recovery approach may be applied to the sparse recovery of multiple polarization channels.

Alternative Dictionaries for Polarization and Spatial Domains

In general, in sparse recovery problems, the linear operator A is decomposed into a basis, or dictionary in which the signal b is assumed sparse, and a measurement matrix. The disclosed matrix operator A decomposes into dictionary and measurement matrices. In equation (3) the dictionary is D and the measurement matrix is $\tilde{A}_M (JC \otimes I_{N'})$.

As previously explained, one way to form the signature dictionary D is as a Kronecker product of a polarization dictionary P and a spatial dictionary S, such that $D = P \otimes S$. Both the polarization dictionary P and spatial dictionary S can easily be replaced by alternatives. The polarization dictionary P is used to capture the variety of expected typical polarization responses in the scene. For example: Urban regions will contain a lot of dihedral, trihedral and wire-like responses due to walls, corners, flat ground, and power lines; Pine forests at lower radar frequencies are expected to contain a lot of dihedral-like responses (from the tree trunks and ground bounce) but not a lot of trihedral responses; etc. The spatial dictionary is used to capture the variety of expected typical spatial responses in the scene. An identity matrix represents isotropic point scattering. Other spatial dictionaries, such as wavelets, curvelets, canonicals, or shape-based dictionaries, may also be used. It is useful to choose a dictionary D in which the scatterers are sparse; such choice is related to the desired application.

Alternative Channel Coupling Matrices

The embodiments described herein include a coupling matrix C. In general, matrix C can contain any complex values; however, recovery performance will be a function of the particular values of C.

Combining with Fast-Time and/or Slow-Time Sub-Sampling Schemes

The slow time and/or fast time compressive sampling schemes may design $A_m$. The channel mapping $A_m$ is a portion of the overall mapping matrix $\tilde{A}_{M'}$. Thus, it is an embodiment of the disclosure to include slow time and/or fast time sampling schemes along with the channel crosstalk model to achieve a reduction in samples in slow time, fast time, and polarization domains.

The present embodiments are described below with reference to flowchart illustrations and/or block diagrams of methods, apparatus, systems and computer program products according to embodiments. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer or other programmable data processing apparatus, to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer, or other programmable apparatus to produce a computer-implemented process such that the instructions which execute on the computer or other programmable apparatus, provide processes for implementing the functions/acts specified in the flowchart and/or block diagram block or blocks.

FIG. 1 is a diagram 100 depicting a method to recover the M'≥M channels from measurements from only M coupled channels of radar polarization data.

As shown in FIG. 1, the data input is radar channel data 102 that includes M coupled channels of radar polarization data ($\tilde{y}$), as shown by 104. Sparse recovery 106 on M coupled channels of radar polarization data $\tilde{y}$ 104 produces an estimate of the polarization dictionary coefficients $\hat{b}$ 108. A representation of the M' channels of radar polarization data can be generated, based on the estimate of the polarization dictionary coefficients $\hat{b}$ 108, as shown by 110.

A matrix multiply, as described above and illustrated with reference to equation (1) yields $\hat{x}=D\hat{b}$, as shown by 114, via line 112, which transforms $\hat{b}$ into an estimate of M' channel reflectivity data $\hat{x}$, as shown by 116. A representation of M' channels of radar polarization data can be generated based on the M' channel reflectivity data $\hat{x}$ (116), as shown by 118.

A matrix multiply by the channel measurement matrix (122, via line 120) transforms the estimate of M' channel reflectivity data $\hat{x}$ into M' channel data $\hat{y}$, where $\hat{y}=\tilde{A}_M\hat{x}$, is a representation of the estimate of the M' channels of radar polarization data in the measurement domain, as shown by 124.

The reconstituted $\hat{y}$ is analogous to the M coupled channels of radar polarization data $\tilde{y}$ except that the missing channels of $\tilde{y}$ have been recovered and crosstalk removed. A representation of the M' channels of radar polarization data can be generated as shown by 126.

Any or all of $\hat{b}$, $\hat{x}$, and $\hat{y}$ are possible products for subsequent data analysis and exploitation. The use of any permutation of $\hat{b}$, $\hat{x}$, and $\hat{y}$ is acceptable.

Figure 2:
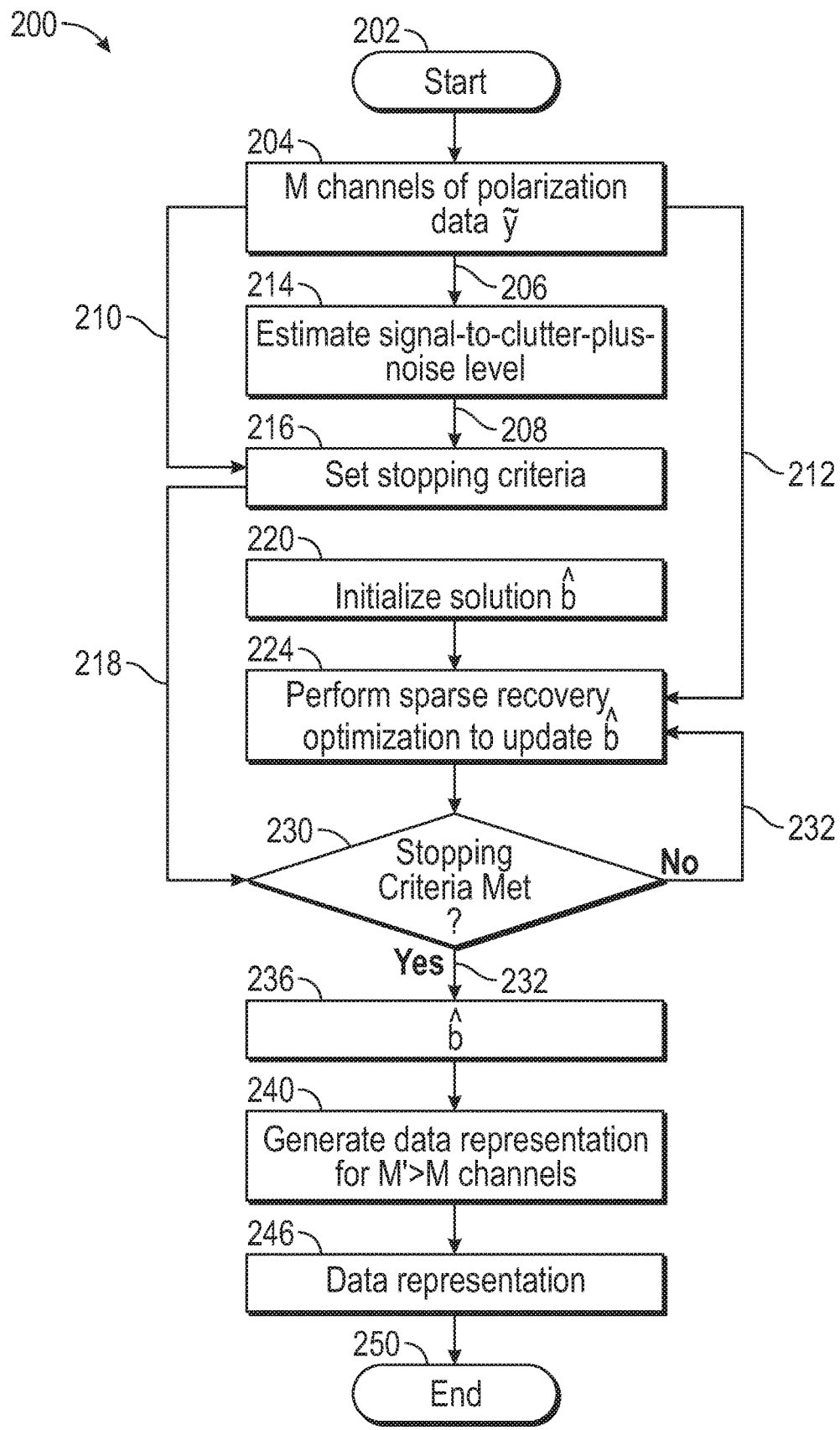
FIG. 2 illustrates a method to generate an estimate of a representation of M' channels of radar polarization data from M coupled channels of radar polarization data when M' is greater than M in accordance with one embodiment disclosed herein.

FIG. 2 illustrates a method 200 to generate a representation of an estimate of M' channels of radar polarization data in accordance with one embodiment disclosed herein. This method 200 may be stored on a computer-readable medium, such as a non-transitory computer readable medium such as electronic data storage locations, ROM, PROM, EEPROM, server location, register or other suitable media. Once accessed the algorithm 200 may be executed on any suitable processor utilizing any suitable input/output (I/O) devices or apparatus.

The method begins (202) and M coupled channels of radar polarization data $\tilde{y}$ are accessed (204). This M coupled channels of radar polarization data $\tilde{y}$ may be accessed (204) from a local or remote electronic storage location, or any accessible electronic storage medium.

An estimate of signal-to-clutter-plus-noise level is accessed (214 as shown by line 206). This parameter is used to determine relative amounts of clutter and/or noise compared to the signal.

A stopping-criteria is set (216 as shown by lines 208 and 210). The stopping criteria is set based on estimated signal to clutter plus noise or set manually based on prior knowledge or experimentation. The stopping criteria is a level of change, in either the solution $\hat{b}$ or in the optimization objective function, below which the optimization is considered complete and the final estimate $\hat{b}$ achieved. The setting of the stopping-criteria may be achieved directly following M coupled channels of radar polarization data $\tilde{y}$ (204, via line 210), or following the estimation of signal-to-clutter-plus-noise level (214, via line 208).

When the change in either the solution $\hat{b}$ or in the optimization objective function reaches an acceptable level, the optimization can terminate, as shown by line 218 reaching decision step 230 to determine whether the stopping criteria has been met.

An initialized solution $\hat{b}$ is accessed (220). This solution $\hat{b}$ (220) and the M coupled channels of radar polarization data (204) are used to perform sparse recovery optimization to update the initial solution $\hat{b}$ (224).

Following the sparse recovery optimization (224), a determination is made whether the stopping criteria has been met (230).

This determination of whether the stopping criteria has been met (230) is also based on the stopping criteria (216), which may also include an estimate of signal-to-clutter-plus-noise level (214) that is utilized to setting the stopping criteria (216). This option is shown in FIG. 2 by line 210 showing that the stopping-criteria can be set independent of the estimate of signal-to-clutter-plus-noise level (214).

If the stopping-criteria (230) has not been met ("no" line 232), the sparse recovery to update the solution $\hat{b}$ is repeated (224).

If the stopping-criteria (230) has been met ("yes" line 234), the update of the solution $\hat{b}$ is complete (236).

Once the solution has been sufficiently optimized, by the criteria being met (230, 232) and the update of the solution $\hat{b}$ is complete (236), a data representation for M'>M channels is generated (240).

The data representation may be provided as an output (246). This representation may be in paper form, electronic form, stored in an electronic memory or displayed on an I/O device or preserved in any other suitable form, format or medium.

The algorithm ends (250).

Figure 3:
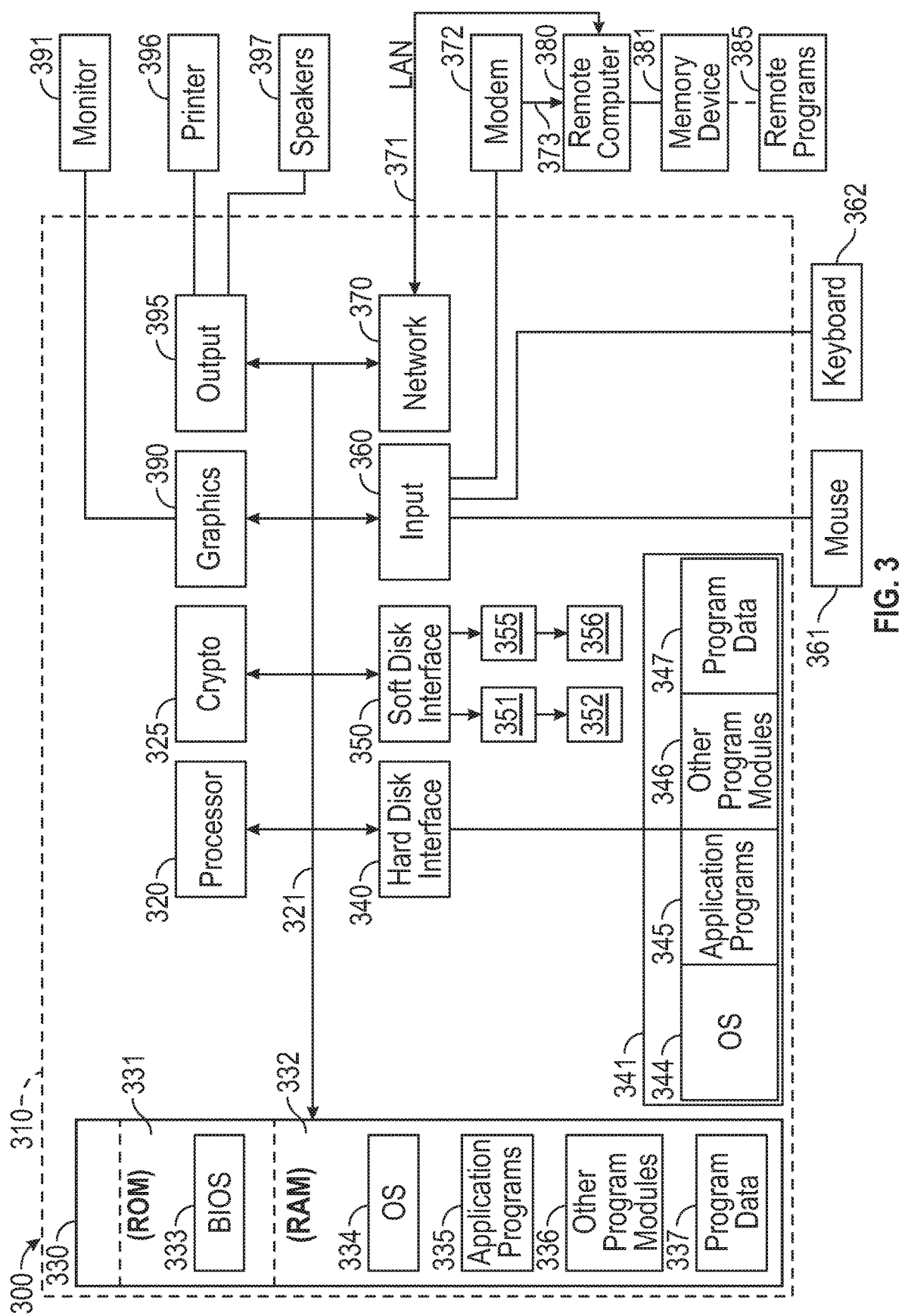
FIG. 3 illustrates a hardware apparatus, in accordance with one embodiment disclosed herein, that may be used to estimate of a representation of M' channels of radar polarization data from M coupled channels of radar polarization data when M' is greater than M.

FIG. 3 illustrates a model computing device 300 in the form of a computer 310 and various peripheral and network components that can perform one or more computer-implemented steps.

One or more of the embodiments may be performed on a computing device. A computing device may be understood to be any device having a processor, memory unit, input, and output. This may include, but is not intended to be limited to, cellular phones, smart phones, tablet computers, laptop computers, desktop computers, personal digital assistants, graphical processing units, field programmable gate arrays, etc. Components of the computer 310 may include, but are not limited to, a processing unit 320, a system memory 330, and a system bus 321 that couples various system components including the system memory to the processing unit 320.

The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI).

The computer 310 may also include a cryptographic unit 325. Briefly, the cryptographic unit 325 has a calculation function that may be used to verify digital signatures, calculate hashes, digitally sign hash values, and encrypt or decrypt data. The cryptographic unit 325 may also have a protected memory for storing keys and other secret data. In other embodiments, the functions of the cryptographic unit may be instantiated in software and run via the operating system.

Computer 310 typically includes a variety of computer readable media. Computer readable media can be any available media that can be accessed by a computer 310 and includes both volatile and nonvolatile media, removable and non-removable media. By way of example, and not limitation, computer readable media may include computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer 310.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates an operating system (OS) 334, application programs 335, other program modules 336, and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives, and their associated computer storage media discussed above and illustrated in FIG. 3, provide storage of computer readable instructions, data structures, program modules and other data for the computer 310. In FIG. 3, for example, hard disk drive 341 is illustrated as storing an OS 344, application programs 345, other program modules 346, and program data 347. Note that these components can either be the same as or different from OS 334, application programs 335, other program modules 336, and program data 337.

The OS 344, application programs 345, other program modules 346, and program data 347 are given different numbers here to illustrate that, at a minimum, they may be different copies. A user may enter commands and information into the computer 310 through input devices such as a keyboard 362 and cursor control device 361, commonly referred to as a mouse, trackball or touch pad.

Other input devices (not shown) may include a microphone, joystick, game pad, satellite dish, scanner, or the like. These and other input devices are often connected to the processing unit 320 through a user input interface 360 that is coupled to the system bus but may be connected by other interface and bus structures, such as a parallel port, game port or a universal serial bus (USB). A monitor 391 or other type of display device is also connected to the system bus 321 via an interface, such as a graphics controller 390. In addition to the monitor, computers may also include other peripheral output devices such as speakers 397 and printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and typically includes many or all the elements described above relative to the computer 310, although only a memory storage device 381 has been illustrated in FIG. 3. The logical connections depicted in FIG. 3 include a local area network (LAN) 371 and a wide area network (WAN) 373 but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 3 illustrates remote application programs 385 as residing on memory device 381.

The communications connections 370 and 372 allow the device to communicate with other devices. The communications connections 370 and 372 are examples of communication media. The communication media typically embodies computer readable instructions, data structures, program modules or other data in a modulated data signal such as a carrier wave or other transport mechanism and includes any information delivery media.

A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if desired, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

Computer program code for carrying out operations may be written in any combination of one or more programming languages, including an object-oriented programming language such as Java, Smalltalk, C++, C# or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 4:
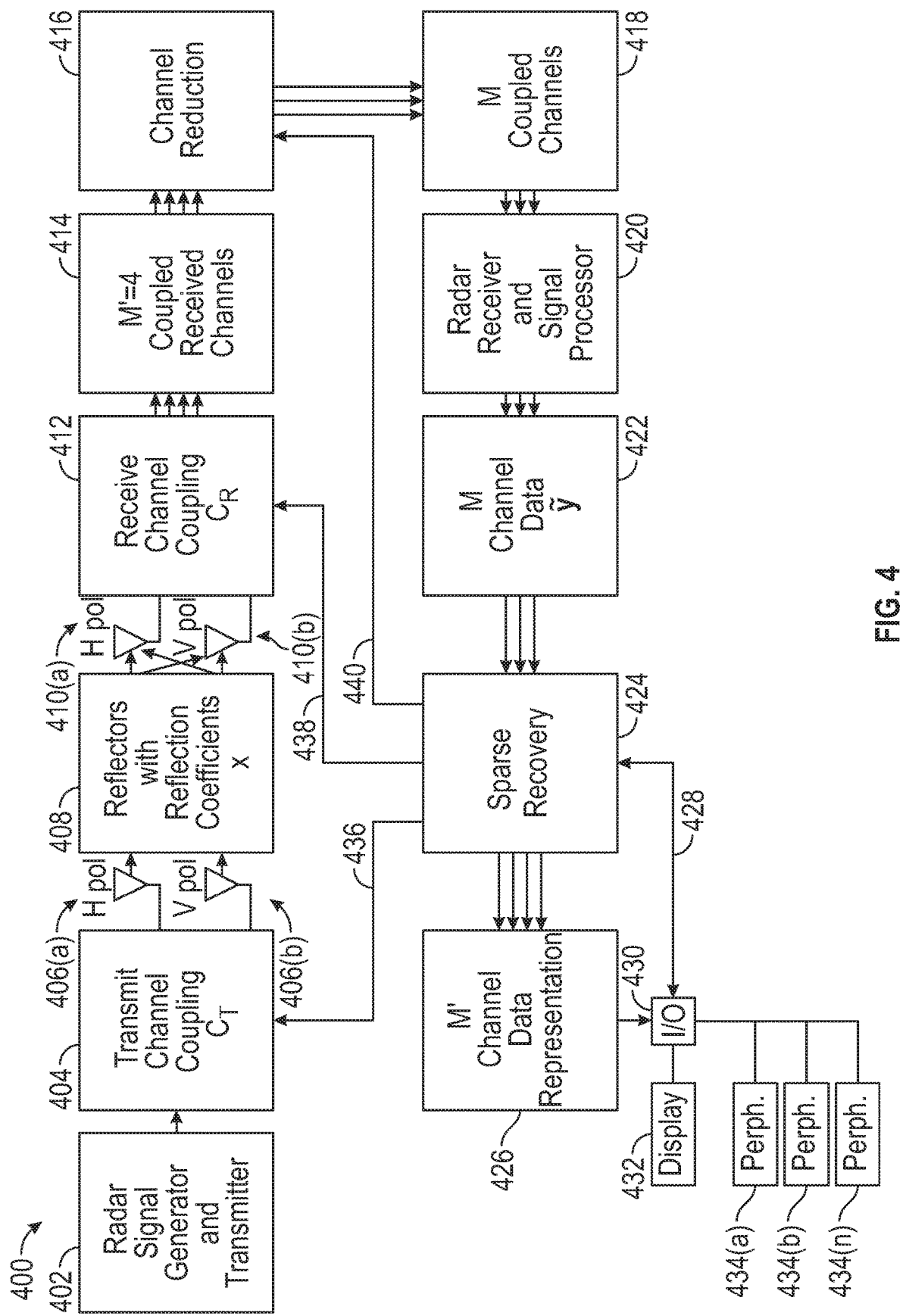
FIG. 4 illustrates a radar system apparatus, in accordance with one embodiment disclosed herein.

FIG. 4 shows a block diagram 400 of a radar system that includes an apparatus as described herein that may be used to perform channel coupling and channel reduction steps for recovery of M'>M channels of radar polarization data. More particularly, the drawing illustrates a radar system apparatus, in accordance with one embodiment disclosed herein, which introduces into the radar, channel coupling and channel reduction devices and a processor module configured to estimate a representation of M' channels of radar polarization data from M coupled channels of radar polarization data where M'>M. The diagram 400 includes various modules or units, as described. Each module, or unit is a processing facility with adequate memory and/or processing power to accomplish the tasks of the module or unit.

FIG. 4 illustrates a radar system apparatus, in accordance with one embodiment disclosed herein, which introduces into the radar, channel coupling and channel reduction devices and a processor module configured to estimate a representation of M' channels of radar polarization data from M coupled channels of radar polarization data where M'>M.

The radar signal generator and transmitter 402 generates signal(s) on one or more transmit channel(s) that are coupled by transmit channel coupling module 404 and radiated via the transmit antennas 406(a) and (b). While two transmit antenna are shown 406(a) and 406(b), any suitable number of transmit antenna could be used with this embodiment. Indeed, many types of radar transmitters exist and may be used. This embodiment utilizes knowledge or an estimation of the transmit channel coupling values, represented by matrix CT (generally 404). Transmit channel coupling module 404 occurs naturally via antenna hardware and feed crosstalk. Active components may be utilized in 404 to set specific crosstalk values which result in improved data reconstruction of the M' channels of radar polarization data. Transmit channel coupling module or unit 404 may be software code, hardware components or a combination of hardware and software with adequate memory and processing power, introduces into the radar, to perform channel coupling function.

The transmit antennas 406 (a) and (b) in the embodiment shown have orthogonal polarization (e.g. horizontal (H) and vertical (V) polarized electric field). The signals emitted from the transmit antennas (generally 406) reflect off of objects in a scene of interest. The scene of interest is an area or objects within a field of view of the transmit antenna (generally 406). The reflectors 408 interact with the transmitted signals and may maintain or alter the electric field polarization orientation. For example, an emitted H polarized electric field may be received on either the H or V polarized receive antennas 410(a) and/or (b), depending on the reflector structure. While two receive antenna are shown, it is an embodiment that any suitable number of receive antenna could be used. The reflector polarization effect is represented by complex reflectivity x.

The receive antennas (generally 410) receive the transmitted and subsequently reflected signals. The receive antennas, shown generally as 410, in the embodiment shown also have orthogonal polarization. In the embodiment shown in FIG. 4, there are two receive antennas 410(a) and 410(b) and two transmit antennas 406(a) and 406(b), which result in M'=4 coupled received channels of radar polarization data 414.

Receive channel coupling 412 in the received signal occurs naturally via antenna hardware and feed crosstalk. This embodiment utilizes knowledge or estimation of the receive channel coupling values, represented by matrix $C_R$. In the embodiment shown, the total coupling matrix is $C=C_T \otimes C_R$. Active components may be utilized in receive channel coupling module, or unit 412 to set specific crosstalk values which result in improved data reconstruction of the M' channels of radar polarization data. Receive channel coupling module or unit 412 may be software code, hardware components or a combination of hardware and software with adequate memory and processing power to perform channel coupling function.

Channel reduction module or component 416, may be software code, hardware components or a combination of hardware and software with adequate memory and processing power to perform the receive function, introduces into the radar, reduces the number of receive channels resulting in data compression and radar receiver hardware reductions. The result is M<M' coupled received channels 418 which are processed by the radar receiver and signal processor 420.

Many types of radar receivers and signal processors 420 may be compatible with this embodiment, or other embodiments described herein. A typical radar receiver will include low noise amplifiers, spectral filters, signal processing filters (e.g. matched filter or down-conversion), analog to digital conversion, etc.

The radar system and methods described herein are able to insert channel coupling and channel reduction into the radar receiver front end, just after the antenna elements and then add additional processing after the radar receiver and signal processor 420. The radar signal processor maps fast-time and slow-time signal measurements to a desired data domain, e.g., range profiles, phase history, or image. The output of the radar receiver and signal processor 420 is the M coupled channels of radar polarization data ($\tilde{y}$) 422.

The sparse recovery module 424 receives the M coupled channels of radar polarization data ($\tilde{y}$) 422 and performs processing steps to recover a representation 426 of M' channels of radar polarization data, where M'=4 in the described embodiment with two receive antenna and two transmit antenna. This processing, shown by FIG. 1 and FIG. 2, includes performing sparse recovery operations on the received M coupled channels of radar polarization data ($\tilde{y}$) and estimating a representation of M' channels of radar polarization data when M' is greater than M. The sparse recovery module 424 has sufficient memory and processing capability to store and execute instructions to produce the desired representation of the M' channels of radar polarization data. The representation 426 of M' channels of radar polarization data may be passed, or transmitted to a display 432 or peripheral device 434(a) . . . (n) (where "n" is any suitable number).

Bi-directional communication medium 428 may be wires, wireless, network, such as the Internet, or other conduit that provides a path for signals between processor 424 and I/O module 430.

The I/O module 430 may include a display device, such as a graphical user interface (GUI), or may be operatively coupled to display module 432, which is used to provide a representation of the estimate of the M' channels of radar polarization data. Display module 432 may be remote from I/O device 430 and interconnected via a network, such as the Internet, not shown. Additional peripheral devices 434(a) . . . (n) (where "n" is any suitable number) may also be operatively coupled to I/O module 428. These peripheral devices 434 (generally) may be printers, thumb drives, non-transitory computer-readable media, remote devices, hand held devices and other electronic devices that are able to communicate with I/O 430.

The quality of the representation of the M' channels of radar polarization data 426 is a function of the transmit channel coupling ($C_T$) and the receive channel coupling ($C_R$), as well as which channel(s) are removed in the channel reduction module 416. The processor 424 may provide feedback 436 and 438 to active channel couplers in blocks 404 and 412, respectively, to adjust $C_T$ and $C_R$ to improve the quality of the representation of the M' channels of radar polarization data. The processor 424 may also provide feedback 440 to the channel reduction module, or unit ("module" and "unit" as described herein) 416 to alter the number or set of channels removed to improve the quality of the representation of the M' channels of radar polarization data.

Figure 5:
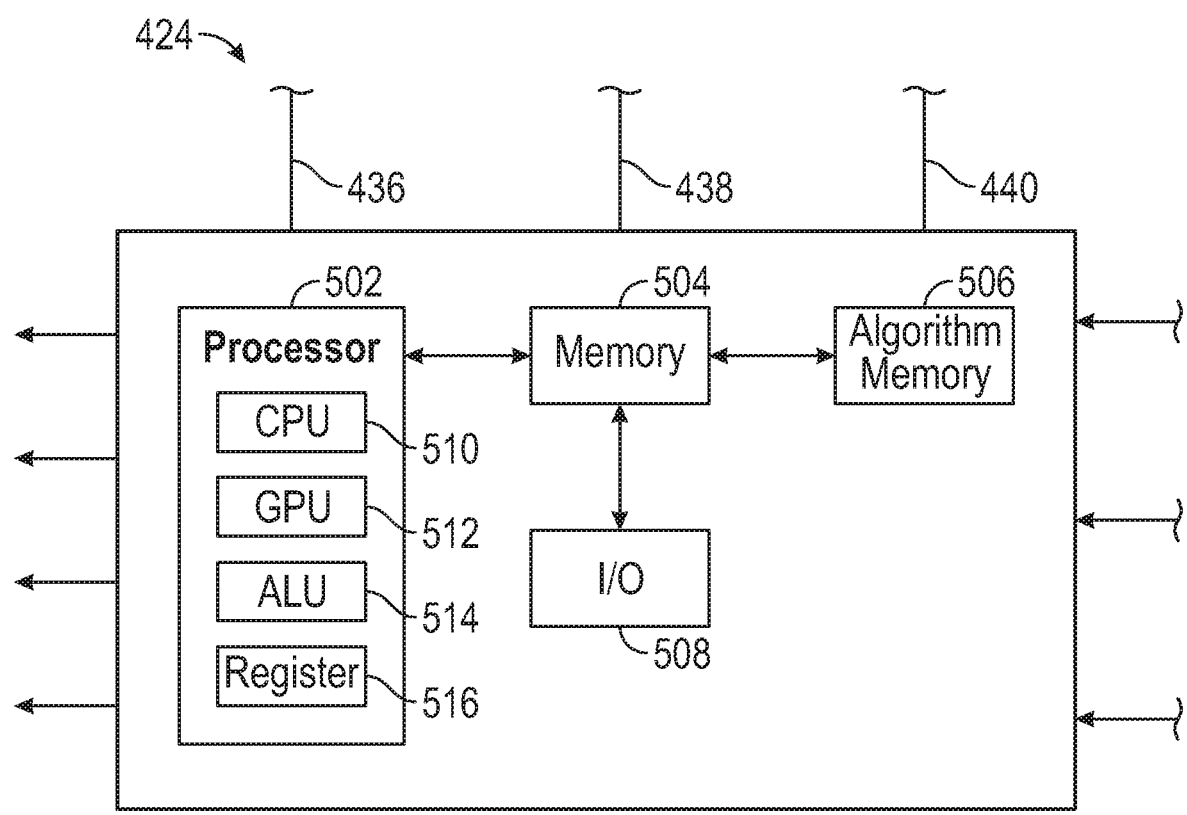
FIG. 5 illustrates a processing module according to an embodiment described herein.

FIG. 5 illustrates a processing module according to an embodiment described herein. The processing module of FIG. 5 is an example of a sparse recovery module 424, as shown in FIG. 4. The sparse recovery module 424 comprises a processor 502, memory 504, algorithm memory 506, and I/O (input/output) 508. Also shown in FIG. 5 are feedback lines 436, 438 and 440, described in relation to FIG. 4, as well as bi-directional communication bus 428, also described in relation to FIG. 4.

The processor 502 is typically one or more computer processors with one or more CPUs (central processing units) 510, one or more GPUs (graphics processing unit) 512, one or more ALUs (arithmetic logic unit) 514, registers 516 and/or other suitable components, not shown. CPUs 510 often include multiple processing cores, which work together to process instructions.

Memory 504 is electronic storage that is used to store instructions for operation of the sparse recovery module 424. Memory 504 is typically any physical device capable of storing information temporarily like RAM (random access memory), or permanently, like ROM (read-only memory). Memory 504 utilizes integrated circuits and is used by operating systems, software, and hardware, that facilitate operation of sparse recovery module 424.

Algorithm memory 506 is a designated electronic storage or memory that stores the sparse recovery algorithm as described herein.

I/O (input/output) module 508 provides access and communication to peripherals. I/O module 508 may be a hardware device that has the ability to accept inputted, outputted or other processed data. It also can acquire respective media data as input sent to a computer or send computer data, to storage media as storage output.

An embodiment disclosed is directed to a method ("the method") comprising: measuring M coupled channels of radar polarization data ($\tilde{y}$); and, performing sparse recovery operations on the measured M coupled channels of radar polarization data ($\tilde{y}$); and, estimating a representation of M' channels of radar polarization data when M' is greater than M.

Another embodiment is directed to the method, where the M coupled channels of radar polarization data is a subset of the M' channels of polarization data.

Another embodiment is directed to the method, where the M coupled channels of radar polarization data $\tilde{y}$ is modeled by $\tilde{y}=Ab+\tilde{w}$ where A is a matrix containing a dictionary matrix (D), b is a complex-valued data coefficient vector, and $\tilde{w}$ is additive noise.

Another embodiment is directed to the method, where elements of the dictionary matrix (D) allow a sparse representation (b) of the M' channels of radar polarization data.

Another embodiment is directed to the method, where the M coupled channels of radar polarization data ($\tilde{y}$) are comprised of radar spatial frequency domain data.

Another embodiment is directed to the method, where the M coupled channels of radar polarization data ($\tilde{y}$) are comprised of radar spatial domain data.

Another embodiment is directed to the method, where the estimate of the representation of the M' channels of radar polarization data is a set of polarimetric radar channel data having reduced crosstalk relative to the M coupled channels of radar polarization data $\tilde{y}$.

Another embodiment is directed to the method, further comprising measuring M coupled channels of radar polarization data ($\tilde{y}$) that is sub-sampled in either fast time or slow-time.

Another embodiment is directed to the method, where the representation of the M' channels of radar polarization data is an estimate of the dictionary coefficients ($\hat{b}$).

Another embodiment is directed to the method, further comprising a series of transforms to generate a second representation of the M' channels of radar polarization data.

Another embodiment is directed to the method, where the transform is a dictionary (D) matrix such that the second representation is an estimate ($\hat{x}=D\hat{b}$) of the M' channels of radar polarization data comprising reflectivity data.

Another embodiment is directed to the method, where the transform is the operator $\tilde{A}_M D$ such that the second representation is an estimate ($\hat{\tilde{y}}=\tilde{A}_M D\hat{b}$) of the M' channels of radar polarization data in a measurement domain.

Another embodiment is directed to the method, where the estimated representation of M' channels of radar polarization data is used for data exploitation tasks.

Another embodiment is directed to the method, where the sparse recovery operations produce an estimate of a measurement matrix (A).

Another embodiment is directed to the method, further comprising: estimating a clutter plus noise level from the M coupled channels of radar polarization data ($\tilde{y}$); and, using the clutter plus noise level to set a stopping criterion for the sparse recovery operations.

Another embodiment is directed to the method, where the sparse recovery includes minimization:

$\hat{b}=\text{argmin}_b \|b\|_1 s.t. \|\tilde{y}-Ab\|_2 \leq \in$, where $\in$ is non-negative.

Another embodiment is directed to the method, where the sparse recovery includes minimization:

$\hat{b}=\text{argmin}_b \|Tb\|_u^{u'}/s.t. \|\tilde{y}-Ab\|_v^{v'} \leq \in$, where $0 \leq u < 2$, u' is positive, v is non-negative, v' is positive, $\in$ is non-negative, and T is a transform matrix.

Another embodiment is directed to the method, where the sparse recovery includes minimization:

$\hat{b}=\text{argmin}_b \|\tilde{y}-Ab\|_v^{v'} s.t. \|Tb\|_u^{u'} \leq \tau$, where $0 \leq u < 2$, u' is positive, v is non-negative, v' is positive, $\tau$ is non-negative, and T is a transform matrix.

Another embodiment is directed to the method, where the sparse recovery includes minimization:

$\hat{b}=\text{argmin}_b \|\tilde{y}-Ab\|_v^{v'} + \lambda \|Tb\|_u^{u'}$, where $0 \leq u < 2$, u' is positive, v is non-negative, v' is positive, $\lambda$ is non-negative and T is a transform matrix.

Another embodiment is directed to the method, where the sparse recovery includes minimization:

$$\hat{b} = \text{argmin}_b \|\tilde{y} - Ab\|_v^{v'} + \sum_i \lambda_i \|T_i b\|_{u_i}^{u_i'}$$

where v is non-negative, v' is positive, $u_i$ are non-negative, $u_i'$ are positive, $\lambda_i$ are non-negative, and $T_i$ are transform matrices.

Another embodiment is directed to the method, where the M coupled channels of radar polarization data $\tilde{y}$ is reshaped into a matrix $\tilde{Y}$ and modeled by $\tilde{Y}=\Theta B+\tilde{W}$, where $\Theta$ is a matrix containing a dictionary matrix (D), B is a complex-valued dictionary coefficient matrix, and $\tilde{W}$ is a matrix of additive noise.

Another embodiment is directed to an apparatus capable of performing the method and comprising: one or more antennas performing transmit function; and one or more antennas performing receive function; and one or more radar signal generators and transmitter devices, operatively coupled to the one or more transmit antennas, configured to effect signal emission from the transmit antennas; and one or more devices, operatively coupled to the one or more receive antennas, configured to discard one or more receive channels to effect reduction of number of signal channels to M; and one or more radar receiver and signal processor devices, operatively coupled to the one or more receive antennas, configured to transform M coupled received signals into M coupled channels of radar polarization data ($\tilde{y}$); and one or more processing devices comprising sparse recovery module, operatively coupled to the one or more radar receiver and signal processing devices, configured to transform M coupled channels of radar polarization data ($\tilde{y}$) into an estimate of a representation of M' channels of radar polarization data where M'>M.

Another embodiment is directed to the apparatus, further comprising: one or more antennas performing the transmit function and the receive function on the same antenna.

Another embodiment is directed to the apparatus, further comprising: a module, introduced into the radar, imparting channel crosstalk on transmit, or a module, introduced into the radar, imparting channel crosstalk on receive.

Another embodiment is directed to the sparse recovery module of the apparatus. In this embodiment the sparse recovery module comprises a processor, and memory operatively coupled to the processor, and the memory adapted to store instructions to measure M coupled channels of radar polarization data ($\tilde{y}$) and perform sparse recovery operations on the measured M coupled channels of radar polarization data ($\tilde{y}$) and estimate a representation of M' channels of radar polarization data when M is greater than M Another embodiment is directed to apparatus comprising: one or more receive antennas that measure M coupled channels of radar polarization data ($\tilde{y}$); and one or more processing devices, operatively coupled to the one or more receive antennas, configured to perform sparse recovery operations on the measured M coupled channels of radar polarization data ($\tilde{y}$) and estimate a representation of M' channels of radar polarization data when M' is greater than M Another embodiment is directed to the apparatus that also includes one or more transmit antennas, operatively coupled to the one or more processing devices, that are configured to transmit radar signals, where the number of recovered radar polarization channels is based on the number of receive antennas and the number of transmit antennas.

Another embodiment is directed to a system that comprises a processor; and a memory operatively coupled to the processor, the memory adapted to store instructions to:

measure M coupled channels of radar polarization data on a set of M channels;

perform sparse recovery operations on the measured radar polarization data; and estimate a representation of M' channels of radar polarization data when M' is greater than M.

As will be appreciated by one skilled in the art, the disclosure may be embodied as a system, method or computer program product. Accordingly, embodiments may take the form of an entirely hardware embodiment, primarily a software embodiment (including firmware, resident software, micro-code, etc.) or an embodiment combining software and hardware aspects that may all generally be referred to herein as a "circuit," "module" or "system." Furthermore, the embodiments may take the form of a computer program product embodied in any tangible medium of expression having computer-usable program code embodied in the medium.

The apparatus, system and methodologies presented herein provide an advancement in the state of the art.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

The invention claimed is:

1. A method comprising:
   transmitting radar signals using one or more transmit antenna;
   receiving the radar signals that are reflected using one or more receive antennas that are configured to receive at least two polarizations;
   measuring M coupled channels of radar polarization data from the received radar signals using a radar receiver;
   performing sparse recovery operations on the measured M coupled channels of radar polarization data utilizing mixing of channel information caused by cross-channel coupling that allows a reduction in a number of polarization channels that the radar receiver needs to process; and
   estimating a representation of M' channels of radar polarization data when M' is greater than M.

2. The method as claimed in claim 1, where the M coupled channels of radar polarization data is a subset of the M' channels of radar polarization data.

3. The method as claimed in claim 1, where the M coupled channels of radar polarization data ($\tilde{y}$) is modeled by $\tilde{y}=Ab+\tilde{w}$ where A is a matrix containing a dictionary matrix (D), b is a complex-valued data coefficient vector, and $\tilde{w}$ is additive noise.

4. The method as claimed in claim 3, where elements of the dictionary matrix (D) allow a sparse representation (b) of the M' channels of radar polarization data.

5. The method as claimed in claim 1, where the M coupled channels of radar polarization data ($\tilde{y}$) are comprised of radar spatial frequency domain data.

6. The method as claimed in claim 1, where the M coupled channels of radar polarization data ($\tilde{y}$) are comprised of radar spatial domain data.

7. The method as claimed in claim 1, where the estimate of the representation of the M' channels of radar polarization data is a set of polarimetric radar channel data having reduced crosstalk relative to the M coupled channels of radar polarization data ($\tilde{y}$).

8. The method as claimed in claim 1, further comprising measuring M coupled channels of radar polarization data ($\tilde{y}$) that is sub-sampled in either fast time or slow-time.

9. The method as claimed in claim 1, where the representation of the M' channels of radar polarization data is an estimate of the dictionary coefficients, ($\hat{b}$).

10. The method as claimed in claim 9, further comprising a series of transforms to generate a second representation of the M' channels of radar polarization data.

11. The method as claimed in claim 10, where the transform is a dictionary matrix (D) such that the second representation is an estimate of the M' channels of radar polarization data comprising reflectivity data.

12. The method as claimed in claim 10, where the transform is the operator $\tilde{A}_M D$ such that the second representation is an estimate of the M' channels of radar polarization data in a measurement domain.

13. The method as claimed in claim 1, where the estimated representation of M' channels of radar polarization data is used for data exploitation tasks.

14. The method as claimed in claim 1, where the sparse recovery operations produce an estimate of a measurement matrix (A).

15. The method as claimed in claim 1, further comprising:
   estimating a clutter plus noise level from the M coupled channels of radar polarization data; and
   using the clutter plus noise level to set a stopping criterion for the sparse recovery operations.

16. The method as claimed in claim 1, where the sparse recovery includes minimization:

$$\hat{b}=\mathrm{argmin}_b \|b\|_1 s.t. \|\tilde{y}-Ab\|_2 \in,$$

where $\in$ is non-negative.

17. The method as claimed in claim 1, where the sparse recovery includes minimization:

$$\hat{b}=\mathrm{argmin}_b \|Tb\|_u^{u'} s.t. \|\tilde{y}-Ab\|_v^{v'} \leq \in,$$

where $0 \leq u < 2$, u' is positive, v is non-negative, v' is positive, $\in$ is non-negative, and T is a transform matrix.

18. The method as claimed in claim 1, where the sparse recovery includes minimization:

$$\hat{b}=\mathrm{argmin}_b \|\tilde{y}-Ab\|_v^{v'} s.t. \|Tb\|_u^{u'} \leq \tau,$$

where $0 \leq u < 2$, u' is positive, v is non-negative, v' is positive, $\tau$ is non-negative, and T is a transform matrix.

19. The method as claimed in claim 1, where the sparse recovery includes minimization:

$$\hat{b}=\mathrm{argmin}_b \|\tilde{y}-Ab\|_v^{v'} + \lambda \|Tb\|_u^{u'};$$

where $0 \leq u < 2$, u' is positive, v is non-negative, v' is positive, $\lambda$ is non-negative and T is a transform matrix.

20. The method as claimed in claim 1, where the sparse recovery includes minimization:

$$\hat{b} = \mathrm{argmin}_b \|\tilde{y} - Ab\|_v^{v'} + \sum_i \lambda_i \|T_i b\|_{u_i}^{u_i'}$$

where v is non-negative, v' is positive, $u_i$ are non-negative, $u_i'$ are positive, $\lambda_i$ are non-negative, and $T_i$ are transform matrices.

21. The method as claimed in claim 1, where the M coupled channels of radar polarization data ($\tilde{y}$) are reshaped into a matrix $\tilde{Y}$ and modeled by $\tilde{Y}=\Theta B+\tilde{W}$, where $\Theta$ is a matrix containing a dictionary matrix (D), B is a complex-valued dictionary coefficient matrix, and $\tilde{W}$ is a matrix of additive noise.

22. The method of claim 1, wherein estimating the representation of M' channels of radar polarization data when M' is greater than M to support a synthetic aperture radar (SAR).

23. An apparatus comprising:
   one or more transmit antennas, operatively coupled to the one or more processing devices, that are configured to transmit radar signals,
   receiving the radar signals that are reflected using one or more receive antennas that are configured to receive at least two polarizations;
   one or more receive antennas that receive the radar signals that are reflected;
   a radar receiver that measures M coupled channels of radar polarization data; and one or more processing devices, operatively coupled to the one or more receive antennas, configured to perform sparse recovery operations on the measured M coupled channels of radar polarization data ($\tilde{y}$) and estimate a representation of M' channels of radar polarization data when M' is greater than M, utilizing mixing of channel information caused by cross-channel coupling that allows a reduction in a number of polarization channels that the radar receiver needs to process wherein each of the one or more processing devices comprise a sparse recovery module having a computer processor and a physical memory operatively coupled to the computer processor.

24. The apparatus as claimed in claim 23, where the number of recovered radar polarization channels is based on the number of receive antennas and the number of transmit antennas.

25. The apparatus of claim 23, wherein the one or more transmit antennas, the one or more receive antennas, the radar receiver, and the one or more processing devices comprise a synthetic aperture radar (SAR).

\* \* \* \* \*